US006982946B2

(12) United States Patent
Wiberg et al.

(10) Patent No.: US 6,982,946 B2
(45) Date of Patent: Jan. 3, 2006

(54) PARTLY ORTHOGONAL MULTIPLE CODE TREES

(75) Inventors: Niclas Wiberg, Linköping (SE); Gunnar Bark, Linköping (SE); Ke Wang Helmersson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 963 days.

(21) Appl. No.: 09/828,340

(22) Filed: Apr. 5, 2001

(65) Prior Publication Data

US 2002/0172264 A1 Nov. 21, 2002

(51) Int. Cl.
H04J 11/00 (2006.01)
(52) U.S. Cl. ........................................ 370/208; 370/335
(58) Field of Classification Search ................ 375/142, 375/146; 370/203, 206, 208, 209, 355
See application file for complete search history.

(56) References Cited

U.S. PATENT DOCUMENTS

| | | | | | |
|---|---|---|---|---|---|
| 5,103,459 | A | * | 4/1992 | Gilhousen et al. .......... | 370/206 |
| 5,414,728 | A | * | 5/1995 | Zehavi ........................ | 375/142 |
| 5,550,809 | A | | 8/1996 | Bottomley et al. ........... | 370/18 |
| 5,715,236 | A | * | 2/1998 | Gilhousen et al. .......... | 370/209 |
| 5,751,761 | A | * | 5/1998 | Gilhousen ................... | 375/146 |
| 5,757,767 | A | * | 5/1998 | Zehavi ........................ | 370/208 |
| 5,771,288 | A | | 6/1998 | Dent et al. ...................... | 380/6 |
| 6,091,760 | A | | 7/2000 | Giallorenzi et al. ........ | 375/140 |
| 6,424,618 | B1 | * | 7/2002 | Uesugi et al. .............. | 370/208 |
| 6,560,194 | B1 | * | 5/2003 | Gourgue et al. ............ | 370/203 |

FOREIGN PATENT DOCUMENTS

| | | |
|---|---|---|
| DE | 10038173 A1 | 3/2001 |
| EP | 0957604 A1 | 11/1999 |
| GB | 2320660 A | 6/1998 |
| WO | WO 00/27049 | 5/2000 |
| WO | WO 00/27052 | 5/2000 |

OTHER PUBLICATIONS

European Patent Office Standard Search Report, File RS 107125, Dec. 19, 2001, pp. 1-4.
Schotten, H.D. et al., "Analysis of a CDMA Downlink with Non-Orthogonal Spreading Sequences for Fading Channels," VTC 2000-Spring 2001 IEEE 51st Vehicular Technology Conference Prceedings, Tokyo, Japan, May 15-18, 2000, IEEE Vehicular Technology Conference, New York, NY: IEEE, US, vol. 3 of 3. Conf. 51, May 15, 2000, pp. 1782-1786.
"TS 25.231 VO.3.0 (Jun. 1999); Technical Specification; 3rd Generation Partnership Project (3GPP); Technical Specification Group (TSG) Radio Access Network (RAN); Working Group 1 (WG1); Physical layer—Measurements," 3rd Generation Partnership Project (3GPP); Technical Specification Group (TSG) Radio Access Network (RAN); Working Group (WG1); Physical Layer—Measurements, XX, XX, pp. 1-28.

* cited by examiner

*Primary Examiner*—Hassan Kizou
*Assistant Examiner*—Albert Chou

(57) ABSTRACT

A method, system and apparatus for spreading physical channels using partly orthogonal multiple code trees. A portion of a first code tree is used to spread the physical channels. This first code tree is a combination of a channelization code sequence and a first scrambling code sequence. A portion of a second code tree is used to spread the physical channels that are remaining and were not spread using the first code tree. This second code tree is a combination of the channelization code sequence and a second scrambling code formed by modifying the first scrambling code. The portion of the second code tree used to spread the channels is orthogonal to the portion of the first code tree used. A plurality of other code trees could be formed using scrambling codes based on the modification of the first scrambling code.

38 Claims, 11 Drawing Sheets

PARTLY ORTHOGONAL MULTIPLE CODE TREES

BACKGROUND OF THE PRESENT INVENTION

1. Field of the Invention

The present invention relates generally to code division multiaccess telecommunications systems and in particular to partly orthogonal multiple code trees.

2. Background of the Present Invention

In a Wideband Code Division Multiple Access (WCDMA) system, a user signal is spread with a wide frequency bandwidth by the use of an individual code and is transmitted in a common frequency band. The receiver detects a desired signal by a despreading process from the WCDMA signal and the individual code. The spreading codes used for a WCDMA system are chosen to have a relatively low cross-correlation between any two sequences in the set. The system is able to distinguish between different users, regardless if the users have a unique code that is orthogonal or non-orthogonal to the other codes. In the non-orthogonal case, correlating the received signal with a code signal from a certain user will then only despread the signal of this user, while the other spread-spectrum signals will remain spread over a large bandwidth. However, the orthogonal case differs in that the other spread-spectrum signals are canceled. Thus, within the information bandwidth the power of the desired user will be larger than the interfering power provided there are not too many interferers, and the desired signal can be extracted. However, interference occurs in the system due to this cross correlation among the spreading codes assigned to users. Unlike other multiple access wireless communication methods, code division multiple access interference is mainly from users within the same cell, rather than users in other cells.

CDMA-based systems have a soft capacity, meaning that there is no "hard" limit to the number of users in the network, as in a TDMA system. However, there are two main limiting factors to the resources in a WCDMA downlink, which are the transmission power and the channelization codes. It is desirable for the channelization codes to be orthogonal, thereby effectively suppressing the interference between the users and increasing the capacity. Furthermore, the channelization codes, which are organized in a code tree, ensure that the downlink channels transmitted in a cell are orthogonal, thus maintaining minimum interference and increasing the capacity of the system. However, the orthogonalized set of channelization codes in a code tree is limited. Thus, multiple code trees distinguish among themselves by their scrambling codes, which are pseudo-noise sequences. In the WCDMA downlink, a spreading sequence is generated by combining a scrambling sequence and a channelization sequence. The channelization sequence consists of a short channel code that is repeated many times. Some commonly used channelization codes are the Orthogonal Variable Spreading Factor (OVSF) codes. These OVSF codes preserve the orthogonality between different physical channels. The scrambling codes are complex valued codes used with the channelization codes to scramble the downlink physical channel.

So, in each cell, there is at least one "primary" code tree and possibly "secondary" code trees, corresponding to "primary" and "secondary" scrambling codes for each code tree, respectively. The "secondary" scrambling codes are created in the same way as the "primary" scrambling codes, except having different seeds.

The problem with multiple code trees is that codes of different code trees are non-orthogonal, causing more interference than desired. This becomes really a problem since a single code tree will be a limiting factor. As understood by those skilled in the art, there are some common channels that have to be transmitted in the entire cell, and these belong, most likely, to one of the code trees, corresponding most likely to the "primary" scrambling codes. These common channels interfere heavily with the user dedicated channels that use other code trees. Moreover, these common channels are transmitted with high power since they have to be detected in the entire cell, hence increasing the interference. Hence, it would be desirable for all user dedicated channels to be orthogonal to these "high power" common channels, even those channels that don't fit in the "primary" code tree. What is needed is to overcome the limitation of a single code tree by creating and using multiple code trees that are at least partly orthogonal to each other to reduce/remove interference.

SUMMARY OF THE INVENTION

The present invention describes a method, system and apparatus for spreading physical channels using partly orthogonal multiple code trees. A portion of a first code tree is used to spread a portion of the physical channels. This first code tree is a combination of a channelization code sequence and a first scrambling code sequence. A portion of a second code tree is used to spread the physical channels that are remaining and were not spread using the first code tree. This second code tree is a combination of the channelization code sequence and a second scrambling code formed by modifying the first scrambling code. The portion of the second code tree used to spread the channels is orthogonal to the portion of the first code tree used. A plurality of other code trees could be formed using scrambling codes based on the modification of the first scrambling code.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE PREFERRED EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The present invention solves the limitation problem of the channelization codes by using multiple code trees. These multiple code trees each structured in a way to minimize the interference in the system. "Secondary" scrambling codes are created using the same seed as the first scrambling codes but further scrambled in a special way as described with reference to the preferred embodiments mentioned thereafter.

Figure 1:
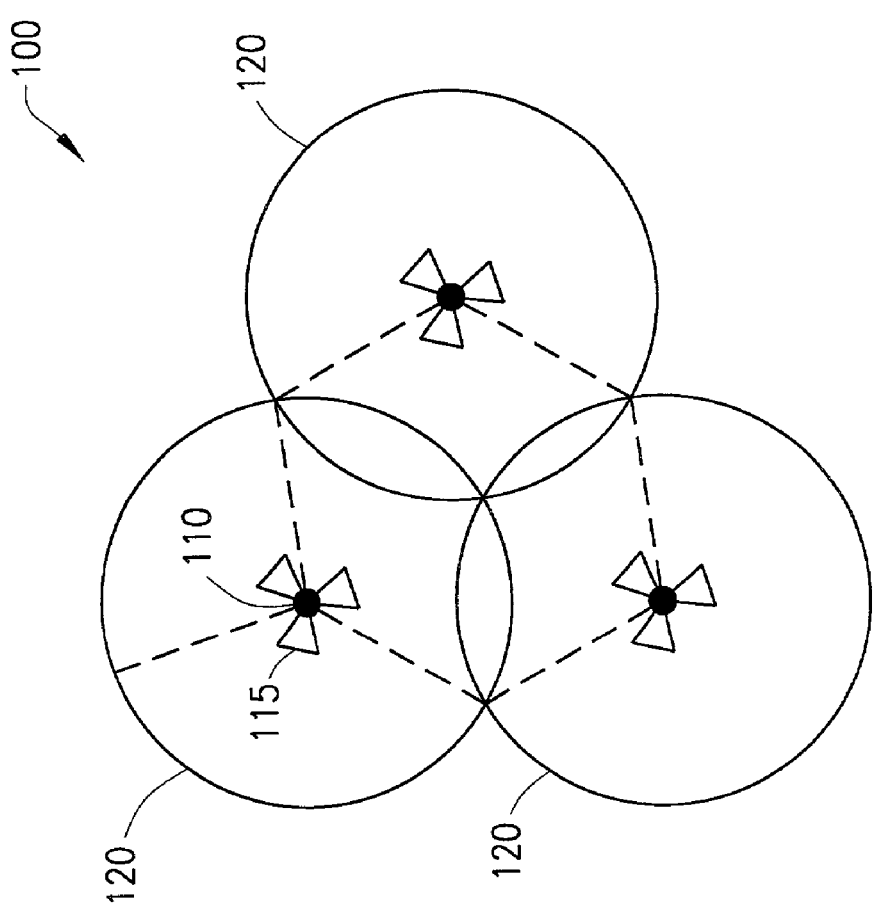
FIG. 1 illustrates a cell architecture in a mobile telecommunication system.

Referring to FIG. 1, there is illustrated a cell architecture 100 in a mobile telecommunications system. There exists a plurality of antennas 115 which represent individual cells 120. Each antenna transmits signals to the users within its corresponding cell 120. Each cell uses a "primary" code tree in the entire cell. This "primary" code tree is associated with a "primary" scrambling code. The "primary" code tree codes are orthogonal to each other, in order to provide a very low cross-correlation between the codes and avoid interference. When all the codes in the "primary" code tree are used, meaning that the "primary" code tree reaches its limit, a "secondary" code tree is used which is associated with a "secondary" scrambling code. These "secondary" scrambling codes are generated by modifying the "primary" scrambling codes using a "tilt" sequence, as described hereinafter with reference to FIG. 5.

Figure 2:
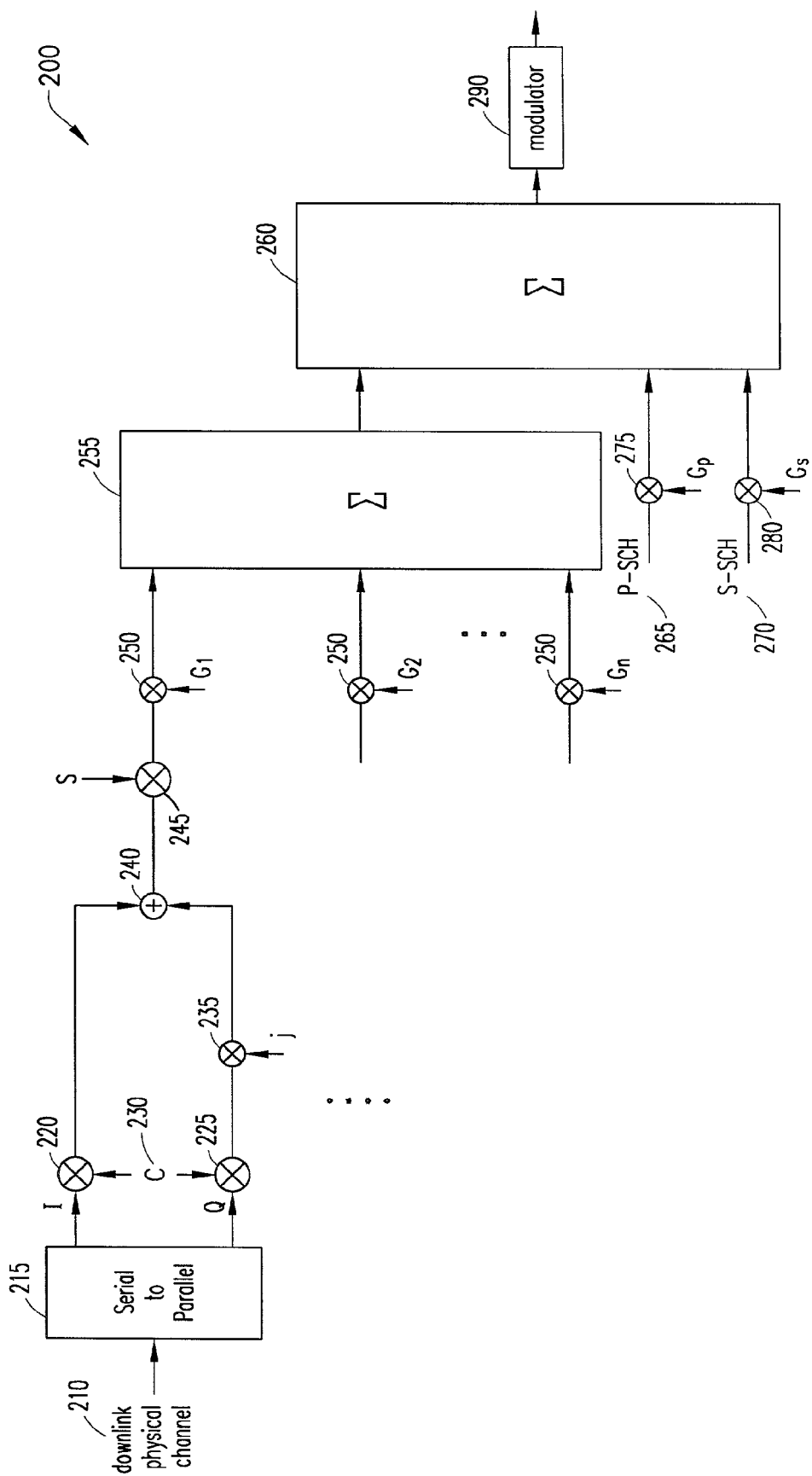
FIG. 2 illustrates the spreading of a downlink signal in WCDMA system.

Referring to FIG. 2, there is illustrated the spreading 200 of a downlink physical channel in a preferred embodiment of the present invention. Each downlink physical channel 210 is converted from a serial to a parallel 215 signal. The parallel signals are mapped on an Inphase (I) and Quadrature (Q) branches. Both branches are spread (220/225) to the chip rate by a real-valued channelization code (C) 230. The Q branch is converted to a complex value, by multiplying 235 that branch by a complex unit value (j). Both branches I and Q are combined 240 and treated as a single complex valued sequence of chips. This single complex valued sequence of chips is scrambled 245 by a complex valued scrambling code (S). This is done by complex chip-wise multiplication 245. This spreading sequence is done for each channel individually using different channelization and scrambling codes. Each spread sequence for each downlink physical channel is separately weighted 250 by a weighting factor (G) and all the sequences are added together (255,260) to be modulated in a modulator 290.

Figure 3:
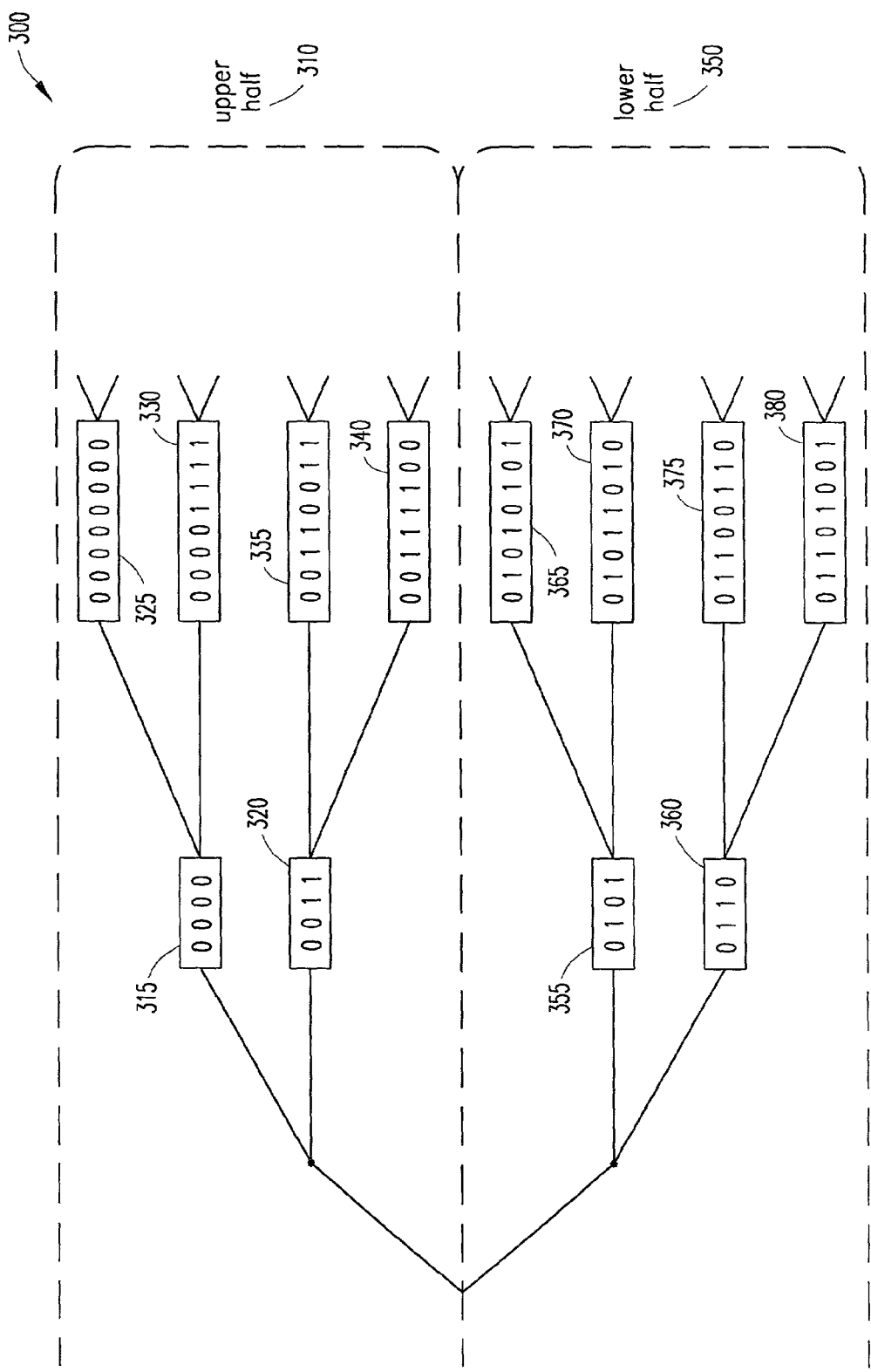
FIG. 3 illustrates the OVSF channelization codes used.

Referring to FIG. 3, there is illustrated the code tree 300 of the Orthogonal Variable Spreading Factor (OVSF) channelization codes used in a preferred embodiment of the present invention. The code trees are separated into two halves, a lower half 350 and an upper half 310. The upper half 310 of the code tree are those codes in which every bit pair are the same, e.g., either '00' or '11'. On the other hand, the lower half 350 contains those codes where every bit pair is different, e.g., either '01' or '10'. It follows that every code in the upper half 310 is orthogonal to every code in the lower half 350. As is well understood in the art, two codes are said to be orthogonal when their inner product is zero. More specifically, the inner product, in the case of codes with element values +1 and −1, is the sum of all the terms we get by multiplying two codes, element by element. For example, (1,1,1,1) and (1,1,−1,−1) are orthogonal: (1*1)+(1*1)+[1*(−1)]+[1*(−1)]=0. Even after applying a scrambling code sequence to the channelization codes for a code tree, orthogonality still holds between both halves of the code tree.

When a "primary" code tree is used in a cell, the lower half 350 is orthogonal with the upper half 310 of that "primary" code tree. Moreover, a "secondary" code tree needs to also be orthogonal to the "primary" code tree. However, only one of the halves is orthogonal to the opposing half of the "primary" code tree. In other words, using the "secondary" scrambling code of a preferred embodiment of the present invention, the lower half 350 of the "primary" code tree will be orthogonal to the upper half 310 of the "secondary" code tree. Also, the upper half 310 of the "primary" code tree is orthogonal to the lower half 350 of the "secondary" code tree. This also holds among all "secondary" code trees, generated according to a preferred embodiment of the present invention described hereafter with reference to FIG. 5, and the "primary" code tree.

Figure 4:
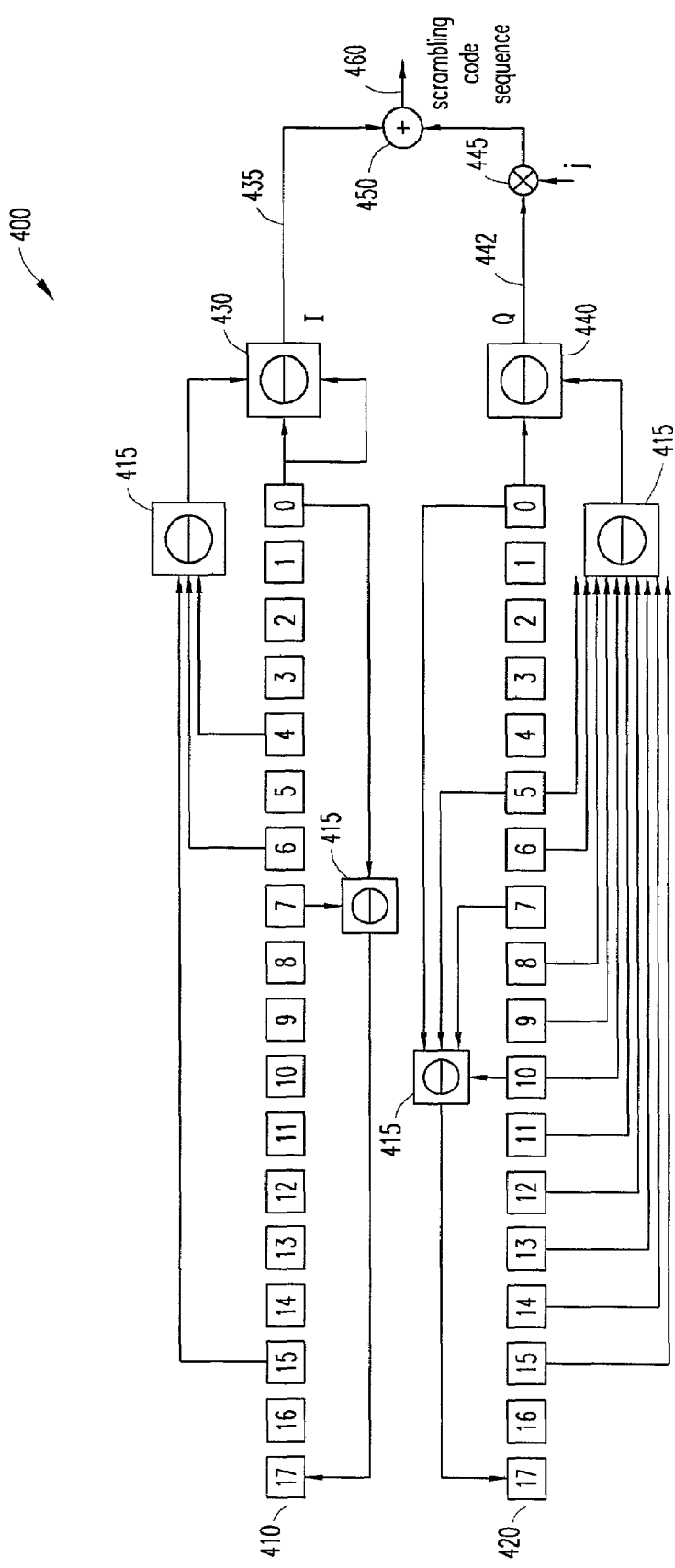
FIG. 4 illustrates a "primary" scrambling code generator.

According to a preferred embodiment of the present invention, the "primary" scrambling code is generated using two linear feedback shift registers 400, as illustrated in FIG. 4. The scrambling code sequences 460 are constructed by combining 450 two real-valued sequences (435,442) into a complex sequence 460. Each of the two real-valued sequences is generated as a modulo 2 sum of selective chips of the shift register (410/420) having a polynomial of degree 18. This generated complex valued "primary" scrambling code 460 is associated with the "primary" code tree. On each cell of the network, shown in FIG. 1, one and only one "primary" scrambling code is assigned. The high power transmitted channels, such as the Common control physical channel (CCPCH), the common pilot channel (CPICH) and the Broadcast control channel (BCH) are always transmitted using the "primary" scrambling code. In a preferred embodiment, only the upper half 310 of the "primary" code tree is used to transmit those common control high power channels. The other downlink physical channels are transmitted with either the "primary" scrambling code associated with the lower half 350 of the "primary" code tree or the "secondary" scrambling code associated with the lower half 350 of the "secondary" code tree. The generation of the "secondary" scrambling code is illustrated, hereafter, with reference to FIG. 5.

Figure 5:
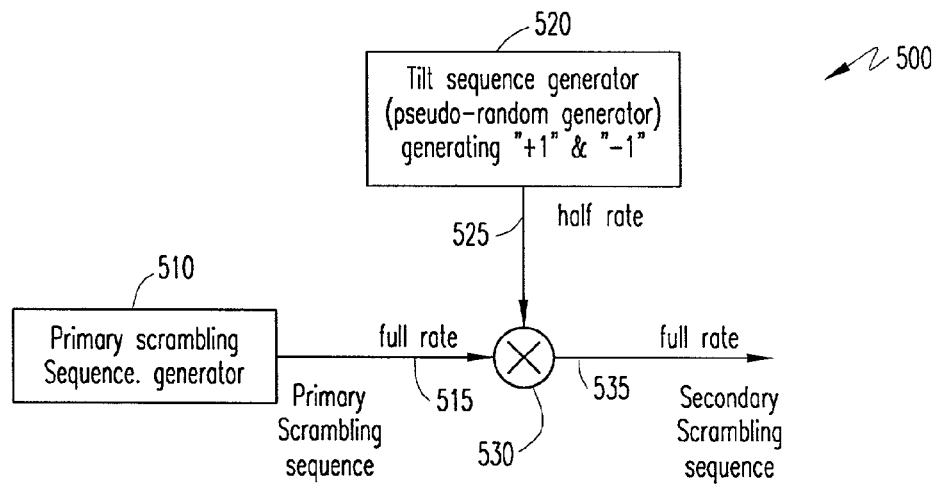
FIG. 5 illustrates generating a "secondary" scrambling code using a "tilt" sequence, according to a preferred embodiment of the present invention.

Referring to FIG. 5, there is illustrated the "secondary" scrambling codes generated using the "primary" scrambling codes 515 and a "tilt" sequence 525. The "primary" scrambling sequence 515 is the code generated using the "primary" scrambling code generator 510 discussed in FIG. 4. This "primary" scrambling sequence 515 is multiplied 530 with a "tilt" sequence 525. The "tilt" sequence 525 consists of "+1" and "−1" which are generated on half the rate of the "primary" scrambling sequence. Meaning, that for every two complex bits in the "primary" scrambling sequence 515 a single bit is generated for the "tilt" sequence 525. In a preferred embodiment, the "tilt" sequence 525 is generated with half the rate of the scrambling sequence, generating −1's and +1's according to a pseudo-random generation sequence 520. So, every two complex bits of the "primary" scrambling sequence are multiplied by one bit of the "tilt" sequence 525 extended in the period of the two complex bits. As an illustration of this, an example is provided herein;

| Primary scrambling seq. | +1 −i | +1 +i | −1 −i | +1 −i | −1 +i | −1 −i | +1 +i | +1 +i | −1 −i | +1 +i | +1 −i | −1 +i |
|---|---|---|---|---|---|---|---|---|---|---|---|---|
| Tilt seq. | −1 | | +1 | | −1 | | +1 | | −1 | | +1 | |
| Secondary scrambling seq. | −1 +i | −1 −i | −1 −i | +1 −i | +1 −i | +1 +i | +1 +i | +1 +i | +1 +i | +1 +i | −1 −i | +1 −i | −1 +i |

In general, a "tilt" sequence 525 could be any sequence, e.g., a pseudo-random generated sequence or a fixed predetermined sequence, that contains +1's and −1's that when multiplied with the "primary" scrambling code sequence will generate a "secondary" scrambling code sequence. When the "tilt" sequence bit is "+1" and is multiplied by the "primary" scrambling sequence complex pair of bits corresponding, in time, to the +1 bit, the resulting "secondary" scrambling complex bit pair, is the same as the "primary" scrambling complex bit pair. However, when the "tilt" sequence bit is "−1" and is multiplied by the "primary" scrambling sequence complex bit pair, the resulting "secondary" scrambling complex bit pair, is the invert of the "primary" scrambling complex bit pair. This is illustrated in the previous example.

The "secondary" scrambling sequence generated by the above-mentioned method has some characteristic features. The "secondary" scrambling sequence 535 is combined with the channelization codes generating the "secondary" code tree, whose lower half 350 is orthogonal to the upper half 310 of the "primary" code tree. Moreover, any "secondary" code tree generated using a "secondary" scrambling sequence 535, as in the present invention, has its lower half 350 orthogonal to the upper half 310 of the "primary" code tree. This feature is very significant, allowing the use of several "secondary" code trees when the channelization codes run out for the "primary" code tree. This creates almost no interference between high power transmitted control channels utilizing the "primary" code tree's upper half and the dedicated channels utilizing both the "primary" and the "secondary" code trees' lower half.

Figure 6A:
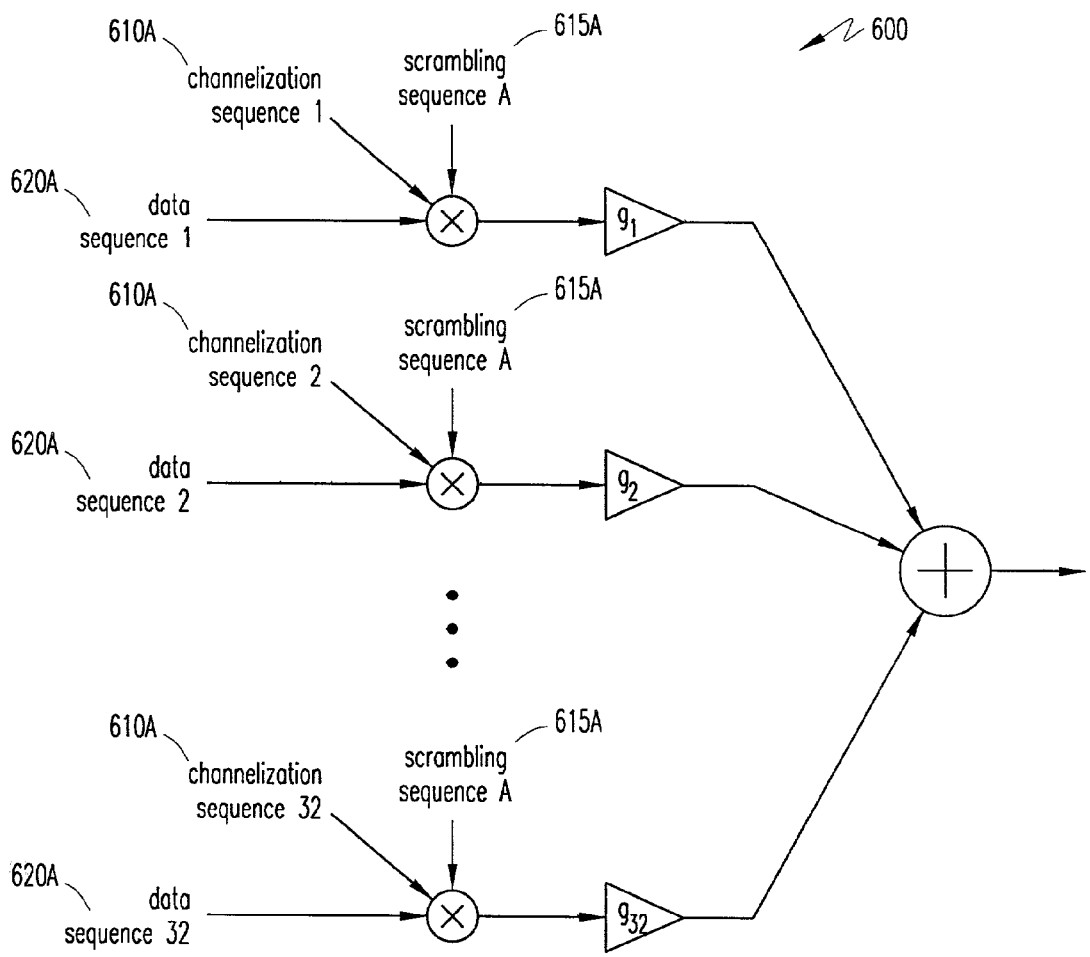
FIG. 6A illustrates a basic and conventional channelization sequence configuration wherein all 32 channelization sequences of spreading factor 32 are used with a "primary" scrambling sequence.

Referring to FIG. 6A, there is illustrated a basic and conventional channelization sequencing configuration 600 wherein all 32 channelization sequences, collectively 610A, of a spreading factor (SF) 32 are used with a "primary" scrambling sequence 615A. This gives a total of 32 orthogonal data channels 620A, which is the maximum that can be achieved without introducing some kind of non-orthogonality. However, when a single scrambling code 615A is used, shortage of channelization sequences may occur. In this particular case, the entire code tree 610B is occupied by the 32 data sequences, collectively 620A, that all use a spreading factor of 32 615B as described hereinafter with reference to FIG. 6B.

Figure 6B:
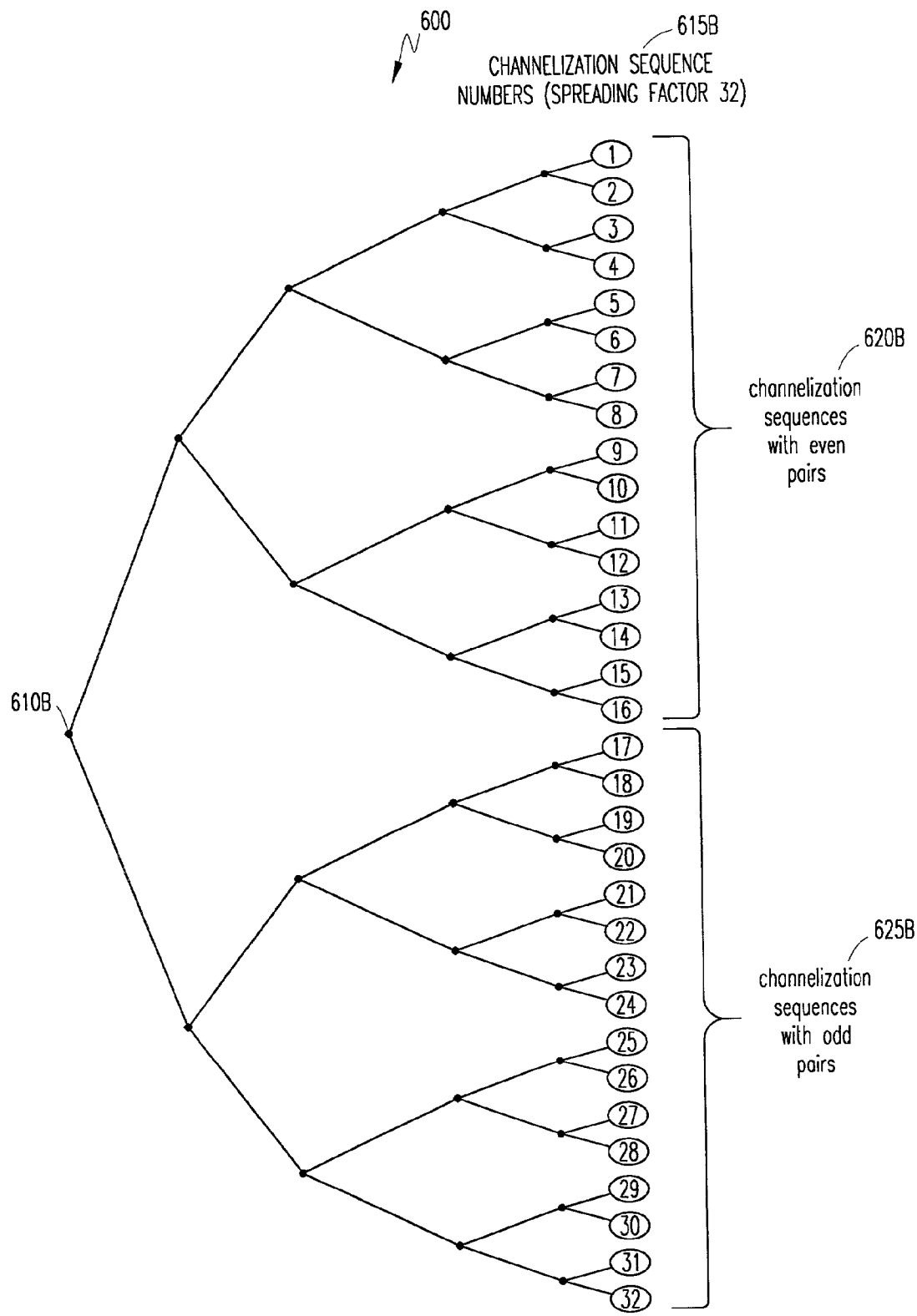
FIG. 6B illustrates a "primary" code tree into which the conventional channelization sequences are organized, according to the configuration of FIG. 6A.

Referring to FIG. 6B, there is illustrated the code tree 610B into which the conventional channelization sequences 610A are organized, indicating that sequences 1–16 (collectively 620B) have the property that each symbol pair is "even", while sequences 17–32 (collectively 625B) have the property that each symbol pair is "odd". As is well known in the art, different spreading factors means different code lengths. Furthermore, as illustrated in the following example, codes or codewords with different spreading factors can be combined to form a code tree using the OVSF Channelization codes described in FIG. 3.

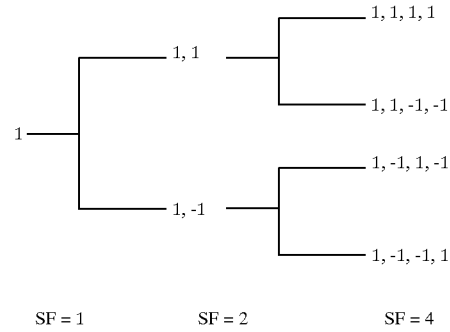

Each stage of the tree has a different Spreading Factor SF. For each Spreading Factor SF, there is an equal number of possible codes. The codes on this particular tree are obtained as follows:

(1) The first element in the tree is 1.

(2) For each element, there are two possible sub-elements, that we will denote as:

A. The "Top" sub-element

B. The "Bottom" sub-element (3) The Top sub-element is constructed by repeating the root of that sub-element twice. So that the Top sub-element of (1) would be (1, 1)

(4) The Bottom sub-element is constructed by concatenating the root of that sub-element with the inverse of itself. Thus, the Bottom sub-element of (1) would be (1, −1).

(5) At each level, all the Walsh-Hadamard codewords are given by the rows of the corresponding Hadamard matrix with the elements mapped to polar form so we can use real numbers arithmetic when computing the correlations. Using a tree structure allows better visualization of the relation between different code lengths and orthogonality between them. Walsh-Hadamard codes are important because they form the basis for orthogonal codes with different spreading factors. This property becomes useful when we want signals with different Spreading Factors to share the same frequency channel.

Figure 7A:
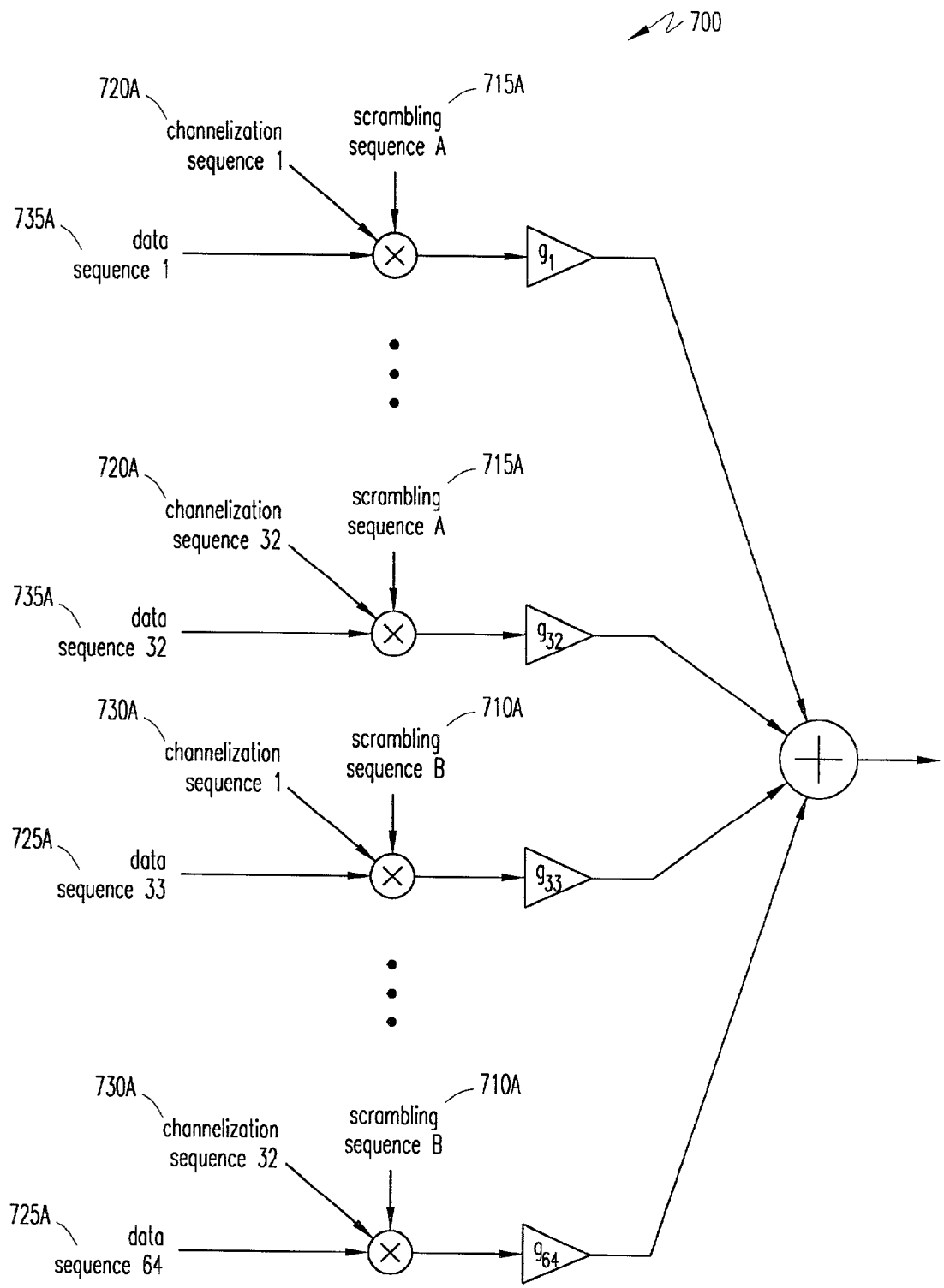
FIG. 7A illustrates a conventional channelization sequence configuration wherein a "secondary" scrambling sequence is introduced.

Referring to FIG. 7A, there is illustrated a conventional channelization sequencing configuration example 700 of how the code limitation (i.e., the channelization sequence shortage) can be circumvented by introducing a "secondary" scrambling sequence 710A to be used together with the "primary" scrambling sequence 715A. The same 32 channelization sequences, collectively 720A, can be re-used, resulting in another set of 32 data channels, collectively 725A (denoted 33–64). Within each scrambling sequence (710A,715A), all channelization sequences(720A, 730A) are orthogonal to each other. However, the sequences generated by different scrambling codes are non-orthogonal. For example, the corresponding generated sequences 730A will be orthogonal to each other, but not to the original 32 sequences 720A, leading to higher interference at the receivers. Thus, sequences 1–32 (720A) are non-orthogonal to all sequences 33–64 (730A), and vice versa.

Figure 7B:
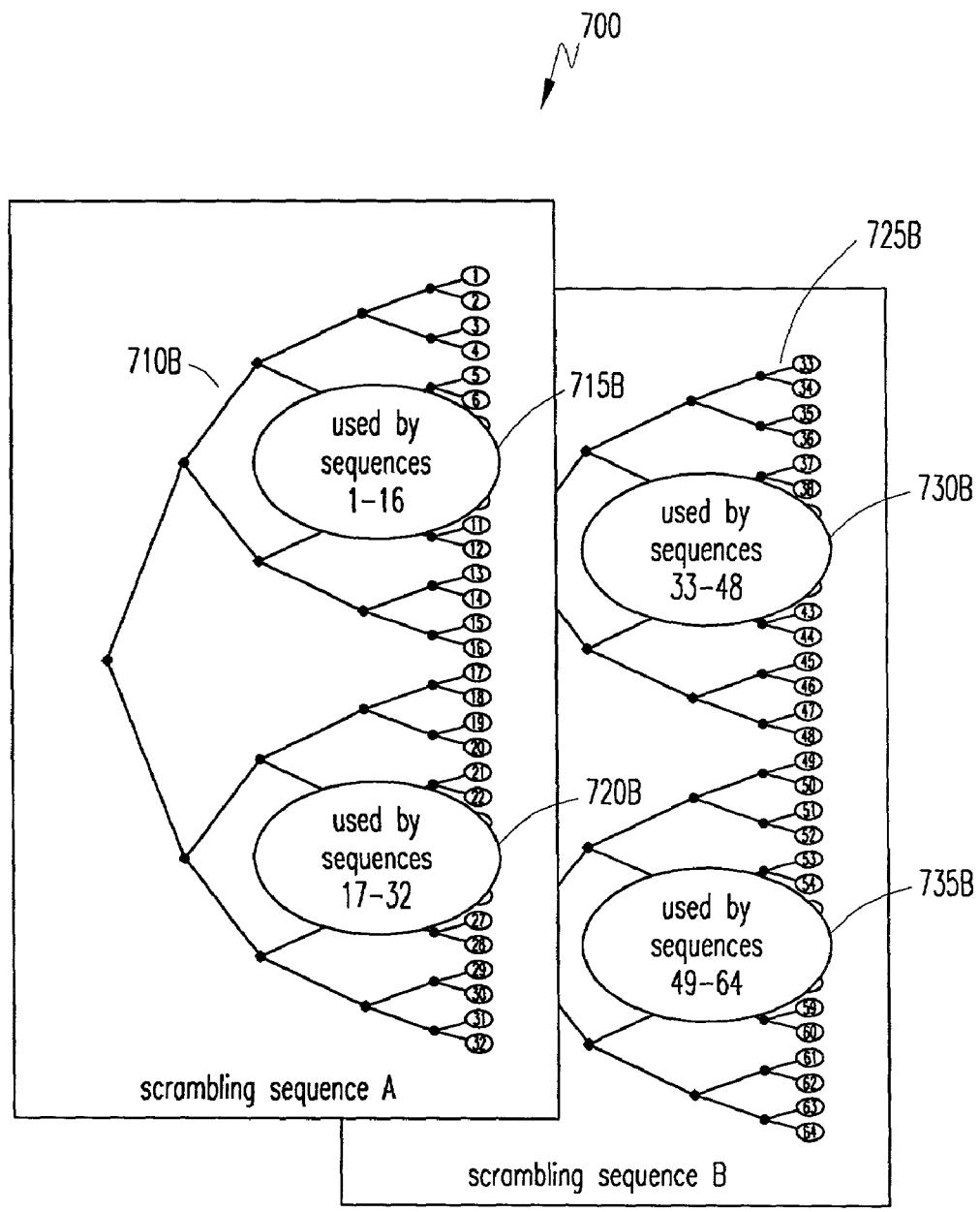
FIG. 7B illustrates a "primary" and "secondary" code trees, each occupied by 32 data sequences, into which the conventional channelization sequences are organized, according to the configuration of FIG. 7A.

Referring to FIG. 7B, there is illustrated a "primary" code tree 710B and a "secondary" code tree 725B. Each tree is occupied by 32 data sequences (725A,735A), into which the conventional channelization sequences (720A,730A) are organized. The entire "primary" code tree 710B is occupied by the original 32 data sequences 735A and the entire "secondary" code tree 725B is occupied by the generated data sequences 725A. For example, in the "primary" code tree 710B, channelization sequence numbers 1–16 (715B) occupy the upper half of the code tree 710B, while channelization sequence numbers 17–32 (720B) occupy the lower half of the code tree 710B. Moreover, channelization sequence numbers 33–48 (730B) occupy the upper half of the "secondary" code tree 725B, while channelization sequence numbers 49–64 (735B) occupy the lower half of the code tree 725B.

Figure 8A:
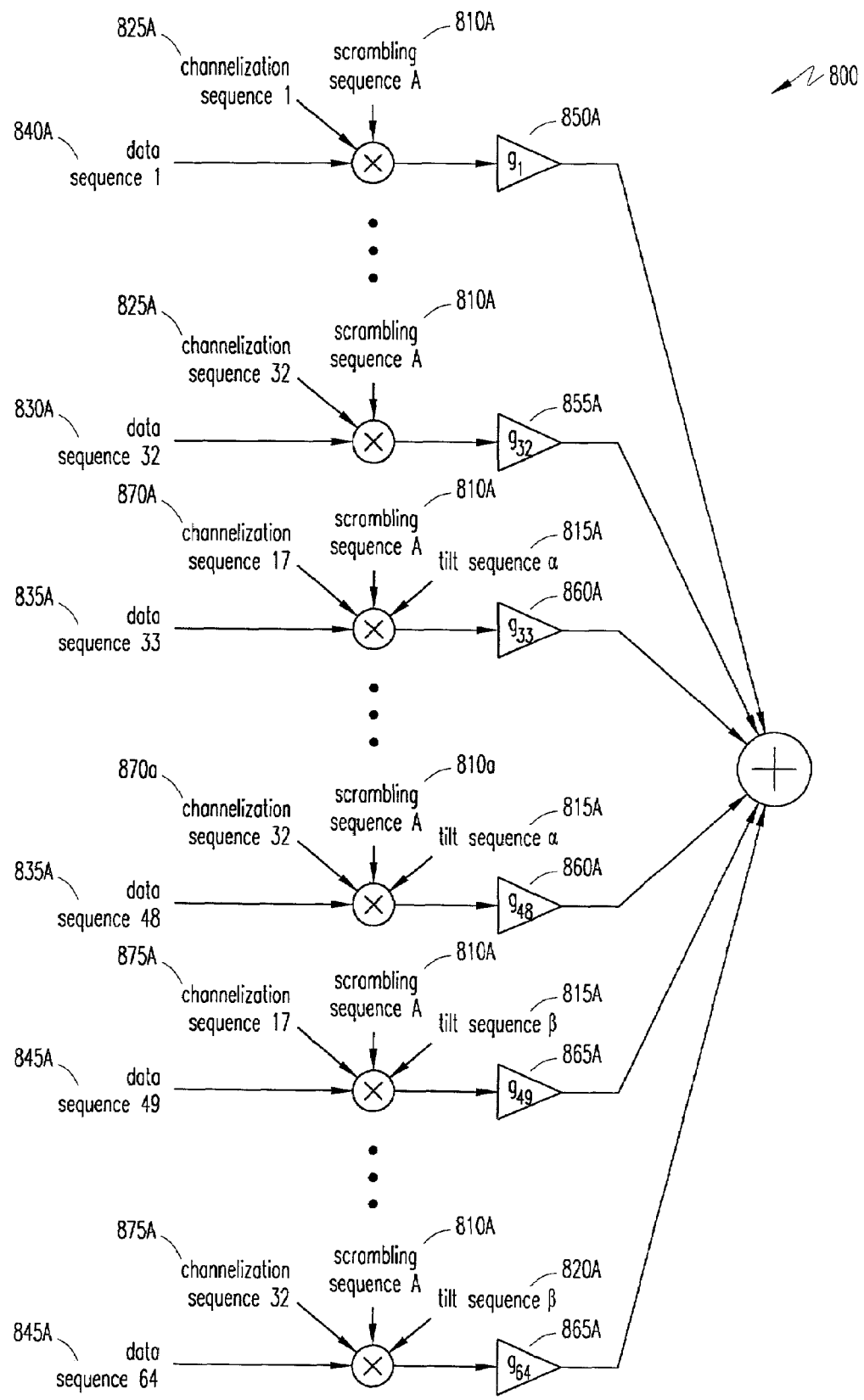
FIG. 8A illustrates an exemplary channelization sequence configuration wherein a "primary" scrambling code is used in combination with "tilt" sequences that operate on symbol pairs, according to a preferred embodiment of the principles of the present invention.

Referring to FIG. 8A, there is illustrated a channelization sequencing configuration example 800 of how the principles of the present invention could be implemented in the same case (i.e., solving the channelization sequence shortage), and possibly reducing the aforementioned resultant interference. As is well known in the art, data transmitted in a CDMA system starts with a standard data rate or full rate. This initial data is then spread with an orthogonal Walsh code at a selected bit rate or chip rate, split into the Inphase (I) and Quadrature (Q) branches, and prior to baseband filtering, spread with long Pseudo-Noise (PN) sequences at the selected chip rate. According to the principles of the present invention, the spreading applies a spreading sequence, using channelization codes (825A,870A,875A), a primary scrambling code (810A), and possibly "tilt" sequences (815A, 820A), to the data sequences (830A,835A,840A,845A), which increases the data rate while adding redundancy to the system. The data sequences (830A,835A,840A,845A) are transmitted using a form of Quadrature Phase Shift Keying (QPSK) modulation, discussed in FIG. 2, which has been filtered to limit the bandwidth of the signal. This is added to the signal of all the other users in that cell. When the signal is received, the coding is removed from the desired signal, returning it to the standard data rate. The ratio of transmitted bits or chips to data bits is the spreading factor (850A,855A, 860A,865A). Thus, it is understood that the standard data rate is smaller than the sum of the rates of all the data sequences (830A, 835A, 840A, 845A).

In a preferred embodiment of the present invention, instead of using secondary scrambling codes, the original scrambling code 810A is modified using "tilt" sequences that operate on symbol pairs. Two "tilt" sequences (815A, 820A) are used in the example (denoted α and β), and only the lower half of the code tree 810B is used with the "tilt" sequences (i.e., channelization sequences 17–32, collectively 825A), as described hereinafter in FIG. 8B. Because of this, data sequences 17–32 (collectively 830A) and the resulting data sequences 33–48 (collectively 835A) and 49–64 (collectively 845A) will be orthogonal to the data sequences 1–16 (collectively 840A). However, sequences 830A are not orthogonal to sequences 835A or 845A and vice versa. Nevertheless, all sequences 830A are orthogonal to each other, while the same remains true for 835A and 845A.

Figure 8B:
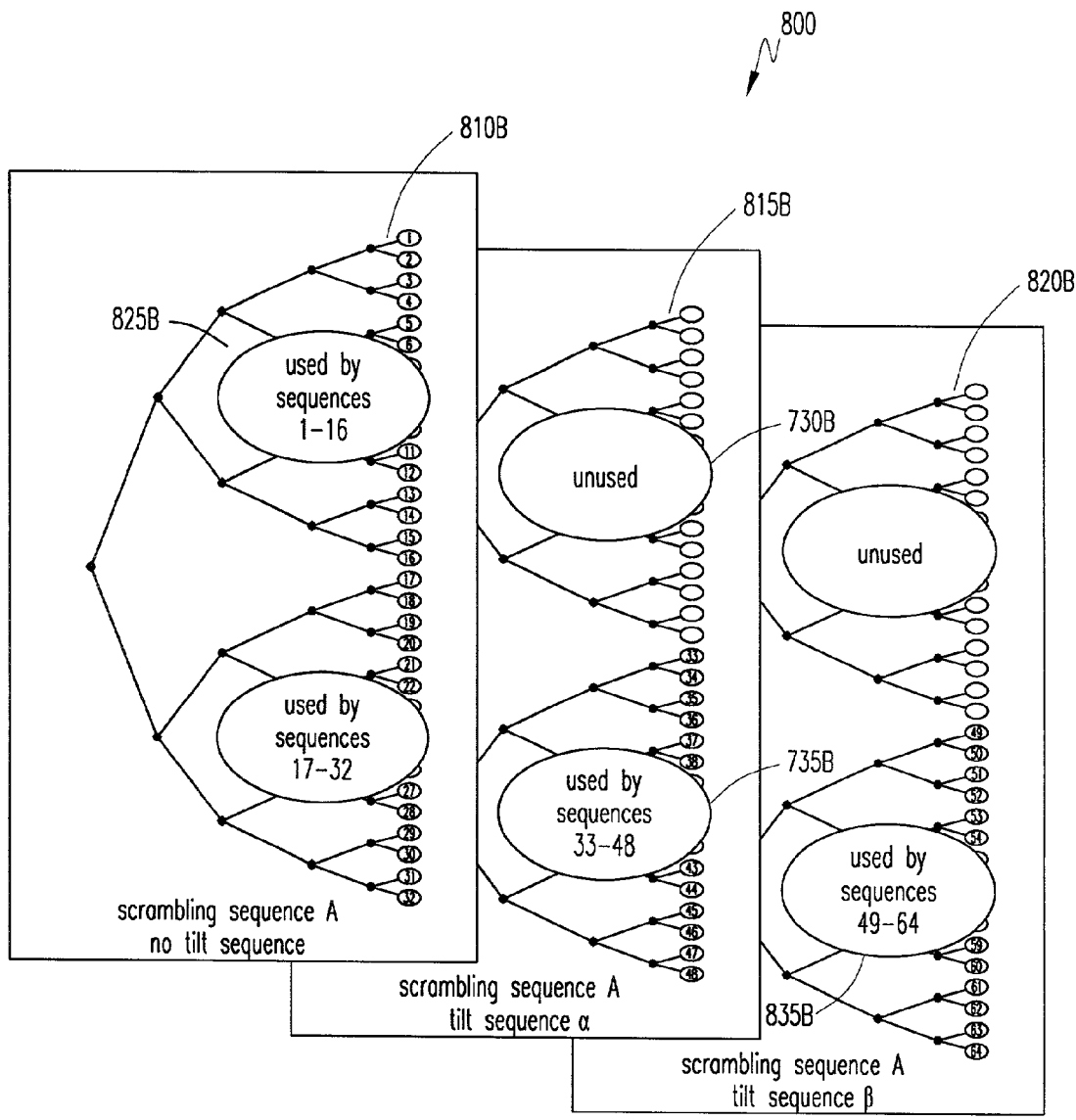
FIG. 8B illustrates an exemplary "untilted" code tree coupled with two "tilted" code trees in which only the lower halves of the "tilted" code trees are occupied by the channelization sequences, according to the configuration of FIG. 8A.

Referring to FIG. 8B, there is illustrated an "untilted" code tree 810B and code trees (815B,820B) with "tilted" sequences. As previously discussed, orthogonality is kept between data sequences (1–16), collectively 825B, on the upper half of the "untilted" code tree 810B and data sequences (33–48 and 49–64), 830B and 835B, on the lower halves of the "tilted" code trees (815B,820B). However, differently "tilted" sequences on the same halves on the code tree are not orthogonal to each other (e.g., data sequences 17–32 are not orthogonal to data sequences 33–48).

The principles of the present invention are particularly useful if the gain factors g1–g16 (collectively 850A) for the data sequences 1–16 (or a few of them) are large compared to the other gain factors g17–g64 (855A,860A,865A). This could be the case with some control channels that have to be receivable from the whole cell. With the prior art shown in FIG. 7B, the sequences 1–16 (715B) would then interfere severely with the reception of the sequences 33–64 (730B, 735B), since they are not orthogonal to each other. In FIG. 8B, on the other hand, sequences 1–16 (825B) are orthogonal to all other sequences 33–64 (830B,835B), so a strong gain on them would effectively be suppressed in the receiver by virtue of this orthogonality.

Figure 9:
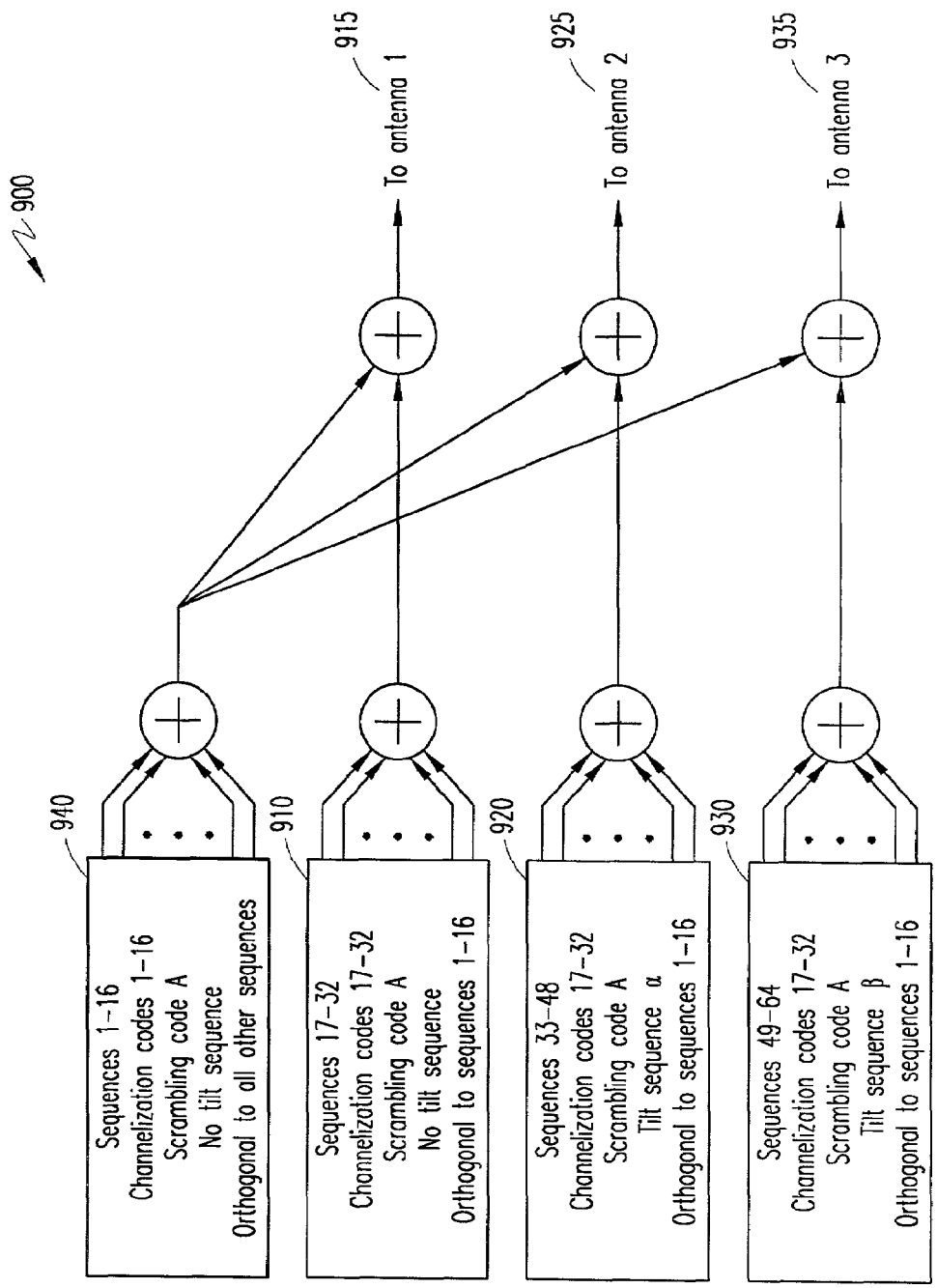
FIG. 9 illustrates an exemplary channelization sequence configuration wherein differently "tilted" sequences are used on different antennas, according to a preferred embodiment of the present invention.

Referring to FIG. 9, there is illustrated a channelization sequencing configuration example 900 of how the principles of the present invention are useful in relation to multiple antennas or antenna beams. In such a case, not all sequences would be added together as shown in FIG. 9. We can assume, instead, that the sequences 17–32 (910) are to be transmitted through one antenna (or beam) 915, sequences 33–48 (920) on a second antenna (or beam) 925, an sequences 49–64 (930) on a third antenna (or beam) 935. We can also assume that the sequences 1–16 (940) have to be transmitted on all the antennas or beams (915,925,935), which could be the case if they are control channels that have to be receivable in the whole cell. Under these assumptions, the use of "tilt" sequences, discussed in FIGS. 8A and 8B, is beneficial, assuming that the sequences are summed and connected to the antennas (or beams) in the way shown in FIG. 9. By using differently "tilted" sequences on different antennas (or antenna beams), the interference caused by the non-orthoganlity between differently "tilted" sequences is reduced. Moreover, all sequences that are transmitted through the same antenna are orthogonal, while the interference caused by non-orthogonality between sequences with different "tilts" is suppressed by the antenna configuration. The benefit compared to using secondary scrambling codes is that some sequences (in the example 1–16) may be transmitted on all antennas while keeping orthogonality. This would not be possible with secondary scrambling codes.

Yet another case when the principles of the present invention are useful is if many sequences are transmitted only part of the time (e.g., due to bursty packet data transfer)

while a few sequences are transmitted more or less continuously. The continuously transmitted sequences would then use the upper half of the code tree with the "untilted" scrambling sequence, while the more bursty sequences would use the lower half of the code tree with "tilt" sequences. In this manner, the bursty sequences would not interfere with the continuous sequences, and vice versa, while the non-orthogonality between some of the bursty sequences (those that use different "tilt" sequences) could be less troublesome because of their low duty cycle. It should be understood that such a scheme could be further improved by scheduling techniques, where the active periods are scheduled so that most (or all) sequences that are transmitted simultaneously actually use the same "tilt" sequence, thereby reducing the interference further.

It should be understood that the embodiments discussed hereinabove refer particularly to downlink physical channels, however, they could be applied to both uplink and downlink channels. Moreover, the present invention could be applied to any CDMA-based system, or even any system were spreading of a signal or a channel is used.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. An interference reduction method comprising the steps of:
    a first generating step for generating a first scrambling code sequence;
    a second generating step for generating a second scrambling code sequence based on a modification of the first scrambling code sequence;
    a first forming step for forming a first code tree associated with the first scrambling code sequence;
    a second forming step for forming a second code tree associated with the second scrambling code sequence;
    a first spreading step for spreading a first signal using a first portion of the first code tree; and
    a second spreading step for spreading a second signal using a second portion of the second code tree, the second portion of the second code tree being orthogonal to the first portion of the first code tree.

2. The method according to claim 1, wherein the first forming step comprises combining a channelization code sequence and the first scrambling code sequence to form a first code tree; and the second forming step comprises combining the channelization code sequence and the second scrambling code sequence to from a second code tree.

3. The method according to claim 1, wherein the first signal is a control channel signal.

4. The method according to claim 1, wherein the second signal is a dedicated physical channel signal.

5. The method according to claim 1, wherein the first portion of the first code tree comprises codes formed by the first scrambling code sequence and a likewise bit pair codes of the channelization code sequence, and the second portion of the second code tree comprises codes formed by the second scrambling code sequence and an unlike-wise bit pair codes of the channelization code.

6. The method according to claim 1, wherein the second generating step comprises combining the first scrambling code sequence and a pseudo-random sequence to generate a second scrambling code sequence.

7. A system for spreading a plurality of physical channels comprising:
    an input for receiving the plurality of physical channels that need to be spread;
    a first code of a first code tree for spreading at least a portion of the plurality of physical channels, wherein the first code spreads only one of the plurality of physical channels, and the first code of the first code tree comprising a combination of a channelization code and a first scrambling code; and
    a second code of a second code tree for spreading a remainder of the plurality of physical channels, wherein the second code spreads only one of the plurality of remainder channels, and the second code of the second code tree comprising a combination of the channelization code and a second scrambling code.

8. The system according to claim 7, wherein the plurality of physical channels comprises a plurality of downlink physical channels.

9. The system according to claim 7, wherein the second scrambling code is generated by modifying the first scrambling code.

10. A method for forming a set of sequences for reducing interference, the method comprising the steps of:
    generating a first subset of the set of sequences, the first subset comprising a first portion being occupied and a second portion being occupied, wherein the sequences within the first portion of the first subset are pair-wise orthogonal to one another, and the sequences within the second portion of the first subset are pair-wise orthogonal to one another and orthogonal to the sequences within the first portion of the first subset; and
    generating at least one other subset of the set of sequences based on a modification of the sequences within the second portion of the first subset, the at least one other subset comprising a first portion being unoccupied and a second portion being occupied, wherein the sequences within the respective second portion of the at least one other subset are respectively pair-wise orthogonal to one another and are orthogonal to the sequences within the first portion of the first subset, whereby, interference between the sequences of the first subset and the sequences of the at least one other subset is reduced.

11. The method according to claim 10, wherein said step generating at least one other subset of the set of sequences is indicative of generating a plurality of other subsets of the set of sequences comprising a first portion being unoccupied and a second portion being occupied.

12. The method according to claim 10, wherein the modification of the sequences within the second portion of the first subset of the set of sequences includes combining the sequences within the second portion of the first subset with a pseudo-random sequence to generate the at least one other subset.

13. The method according to claim 10, wherein the respective second portion of the at least one other subset is not a part of the first subset of the set of sequences.

14. The method according to claim 10, wherein the first portion of the first subset is used for data sequences having large gain factors.

15. The method according to claim 10, wherein the sequences within the second portion of the first subset and the sequences within the respective second portion of the at least one other subset are transmitted through different antennas.

16. The method according to claim 15, wherein the sequences within the first portion of the first subset are transmitted distributively on the different antennas, the sequences of the first portion of the first subset being control channels.

17. The method according to claim 10, wherein an antenna transmits the sequences within the second portion of the first subset, the sequences being orthogonal to each other.

18. The method according to claim 10, wherein an antenna transmits the sequences within the respective second portion of the at least one other subset, the sequences being orthogonal to each other.

19. The method according to claim 10, wherein the sequences within the second portion of the first subset and the sequences within the respective second portion of the at least one other subset are not orthogonal.

20. The method according to claim 10, wherein the first portion of the first subset is used for continuously transmitted signals, and the second portion of the first subset and the second portion of the at least one other subset are used for bursty signals.

21. A method for spreading a plurality of physical channels comprising the steps of:
receiving the plurality of physical channels that need to be spread;
spreading at least a portion of the plurality of physical channels using a first code of a first code tree, the first code tree comprising a primary set of sequences and a secondary set of sequences, wherein the first code spreads only one of the plurality of physical channels, and the first code of the first code tree comprising a combination of a channelization code and a first scrambling code;
spreading a remainder of the plurality of physical channels using a second code of a second code tree, the second code tree comprising a resultant set of sequences, wherein the second code spreads only one of the plurality of remainder channels, and the second code of the second code tree comprising a combination of the channelization code and a second scrambling code; and
outputting a set of sequences, the set of sequences comprising at least one of the following:
the primary set of sequences of the first code tree;
the secondary set of sequences of the first code tree; and
the resultant set of sequences of the second code tree.

22. The method according to claim 21, wherein the second scrambling code is generated by modifying the first scrambling code.

23. The system according to claim 21, wherein the plurality of physical channels are input sequences and the set of output sequences have a common rate, whereby the common rate is smaller than the sum of the rates of the input sequences.

24. A method for forming a set of sequences for reducing interference, the method comprising the steps of:
generating the set of sequences; and
partitioning the set of sequences into subsets, the sequences within the respective subsets being respectively pair-wise orthogonal to one another, at least one of the subsets containing a primary set of sequences that are mutually orthogonal to the other sequences in the other subsets, whereby, interference between the sequences of the at least one of the subsets and the other sequences of the other subsets is reduced.

25. A sequence generating apparatus for forming a set of sequences, the sequence generating apparatus comprising:
a generator for generating the set of sequences; and
a partitioner for partitioning the set of sequences into subsets, the sequences within the respective subsets being respectively pair-wise orthogonal to one another, at least one of the subsets containing a primary set of sequences and a secondary set of sequences, wherein the primary set of sequences are mutually orthogonal to the other sequences of the other subsets, whereby, interference between the sequences of the at least one of the subsets and the other sequences of the other subsets is reduced.

26. The sequence generating apparatus according to claim 25, wherein the other sequences of the other subsets is not a part of the sequences of the at least one of the subsets of the set of sequences.

27. The sequence generating apparatus according to claim 25, further comprising:
a modifier for modifying the secondary set of sequences of the at least one of the subsets, the modifier combining the secondary set of sequences of the at least one of the subsets with a pseudo-random sequence forming the other subsets.

28. The sequence generating apparatus according to claim 25, wherein the other sequences of the other subsets contain only a secondary set of sequences.

29. The sequence generating apparatus according to claim 25, wherein the primary set of sequences of the at least one of the subsets is used for data sequences having large gain factors.

30. The sequence generating apparatus according to claim 25, wherein the secondary set of sequences of the at least one of the subsets and the other sequences of the other subsets are transmitted through different antennas.

31. The sequence generating apparatus according to claim 25, further comprising:
an antenna for transmitting the secondary set of sequences of the at least one of the subsets, the secondary set of sequences of the at least one of the subsets being pair-wise orthogonal to one another.

32. The sequence generating apparatus according to claim 25, further comprising:
at least one other antenna for transmitting a single one of the other sequences of the other subsets, the single one of the other sequences of the other subsets being pair-wise orthogonal to one another.

33. The sequence generating apparatus according to claim 25, wherein the primary set of sequences of the at least one of the subsets is used for continuously transmitted signals, and the secondary set of sequences of the at least one of the subsets and the other sequences of the other subsets are used for bursty signals.

34. A system utilizing a set of sequences for reducing interference therein, the system comprising:
means for sending signals formed from sequences of a first subset of the set of sequences, the first subset comprising a first portion being occupied and a second portion being occupied, wherein the sequences within the first portion of the first subset are pair-wise orthogonal to one another, and the sequences within the second portion of the first subset are pair-wise orthogonal to one another and orthogonal to the first portion of the first subset; and
means for sending signals formed from sequences of at least one other subset of the set of sequences based on a modification of the sequences within the second portion of the first subset, the at least one other subset comprising a first portion being unoccupied and a second portion being occupied, wherein the sequences within the respective second portion of the at least one other subset are pair-wise orthogonal to one another, and orthogonal to the sequences within the first portion of the first subset, whereby, interference between the signals using the sequences of the first subset and the signals using the sequences of the at least one other subset is reduced.

35. The method according to claim 34, wherein the modification of the sequences within the second portion of the first subset of the set of sequences includes combining the sequences within the second portion of the first subset with a pseudo-random sequence to generate the at least one other subset.

36. The system according to claim 34, wherein the system is selected from the group consisting of a communication system and a wireless communication system.

37. The system according to claim 34, wherein the signals formed from the first portion of the first subset comprises control signals.

38. The system according to claim 37, wherein the signals formed from the second portion of the first subset and the second portion of the at least one other subset comprises physical dedicated channel.

* * * * *

UNITED STATES PATENT AND TRADEMARK OFFICE
CERTIFICATE OF CORRECTION

PATENT NO. : 6,982,946 B2 Page 1 of 1
APPLICATION NO. : 09/828340
DATED : January 3, 2006
INVENTOR(S) : Wiberg et al.

It is certified that error appears in the above-identified patent and that said Letters Patent is hereby corrected as shown below:

In Column 14, Line 10, in Claim 38, delete "claim 37" and insert -- claim 34 --, therefore.

Signed and Sealed this

Twenty-seventh Day of November, 2007

JON W. DUDAS
*Director of the United States Patent and Trademark Office*